United States Patent
DiGiovanni et al.

(10) Patent No.: US 6,389,186 B1
(45) Date of Patent: May 14, 2002

(54) OPTICAL WAVEGUIDE LASERS AND AMPLIFIERS WITH PUMP POWER MONITORS

(75) Inventors: David John DiGiovanni, Montclair; Jane Deborah LeGrange, Princeton, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/303,383

(22) Filed: Apr. 30, 1999

(51) Int. Cl.[7] .................................................. G02B 6/00
(52) U.S. Cl. ........................... 385/12; 385/39; 385/48; 372/6
(58) Field of Search ............................. 385/39, 48, 42, 385/89, 12; 372/6

(56) References Cited

U.S. PATENT DOCUMENTS 5,504,762 A * 4/1996 Hutchison ..................... 372/29
5,999,548 A * 12/1999 Mori et al. ..................... 372/6

* cited by examiner

*Primary Examiner*—Cassandra Spyrou
*Assistant Examiner*—Fayez Assaf
(74) *Attorney, Agent, or Firm*—Lowenstein Sandler PC

(57) ABSTRACT

In accordance with the invention, a pumped waveguide device comprising a pump waveguide and an active waveguide is provided with a pump power monitor by disposing between the pump source and the active waveguide, an indicator waveguide having a core doped with a material sensitive to the pump light. For example the material can fluoresce in response to pump light or absorb pump light and generate heat. Pump power is then accurately measured by the fluorescence or heat from the indicator waveguide. Since the fluorescence or heat is generated in the doped core, the measurement is sensitive to the pump power that will enter the active waveguide and is relatively insensitive to changes in mode distribution. Exemplary embodiments include monitored cladding pumped fiber lasers, amplifiers and light sources.

11 Claims, 1 Drawing Sheet

OPTICAL WAVEGUIDE LASERS AND AMPLIFIERS WITH PUMP POWER MONITORS

FIELD OF THE INVENTION

This invention relates to pumped waveguide devices with pump power monitors. It is particularly useful as a cladding pumped fiber device.

BACKGROUND OF THE INVENTION

Pumped waveguide devices are highly useful in optical communication systems. Such devices comprise a pump source, a length of active waveguide and a pump waveguide for transmitting pump light from the source to the active waveguide. The waveguides are typically fibers, and the pump source is usually one or more semiconductor diodes. The active waveguide typically has a rare earth doped core. The devices are used as optical amplifiers and, when provided with an optical resonance cavity, as optical lasers.

In a cladding pumped fiber device the active waveguide is typically a double clad fiber containing a single mode rare earth doped core, and the pump waveguide is a multimode fiber for transmitting pump light to the double clad fiber. The device can be configured into a fiber laser by forming high and low reflectivity Bragg gratings within the double clad fiber to define a laser cavity.

In communications applications, among others, it is important to be able to measure the pump power launched into a cladding pumped device. Such measurement is necessary to monitor the pump source and to correct for power drifts. It is also necessary to accurately test the output.

While there are a variety of approaches to measuring pump power, none are wholly satisfactory. One approach is to place detectors at the back facets of the pump diodes. But the detectors do not measure drifts in the launch of the pump light. For example, the diode output may remain constant but the distribution of light emitted from various modes of the diode may change. Since different modes have different efficiencies of coupling into the active waveguide, the launched power changes without detection.

A second approach involves the use of integrating spheres to detect light scattered from the pump waveguide. But the scattered light is light not guided by the pump waveguide rather than the light launched into the active waveguide. So this approach does not provide a direct measure of the launched light. Moreover, the outermost parts of the mode distribution contribute most strongly to the light scattered out of the pump waveguide but contribute least to the light actually pumping the active waveguide core. Thus measurement of the scattered light—by integrating sphere or any other means—varies with changes in mode distribution and does not serve as an accurate measure of launched pump light. Accordingly there is a need for a pumped waveguide device with an improved monitor for measuring pump power.

SUMMARY OF THE INVENTION

In accordance with the invention, a pumped waveguide device comprising a pump waveguide and an active waveguide is provided with a pump power monitor by disposing between the pump source and the active waveguide, an indicator waveguide having a core doped with a material sensitive to the pump light. For example the material can fluoresce in response to pump light or absorb pump light and generate heat. Pump power is then accurately measured by the fluorescence or heat from the indicator waveguide. Since the fluorescence or heat is generated in the doped core, the measurement is sensitive to the pump power that will enter the active waveguide and is relatively insensitive to changes in mode distribution. Exemplary embodiments include monitored cladding pumped fiber lasers, amplifiers and light sources.

BRIEF DESCRIPTION OF THE DRAWINGS

The nature, advantages, and various additional features of the invention will appear more fully upon consideration of the illustrative embodiments now to be described in detail in connection with the accompanying drawings. In the drawings.

DETAILED DESCRIPTION

Figure 1:
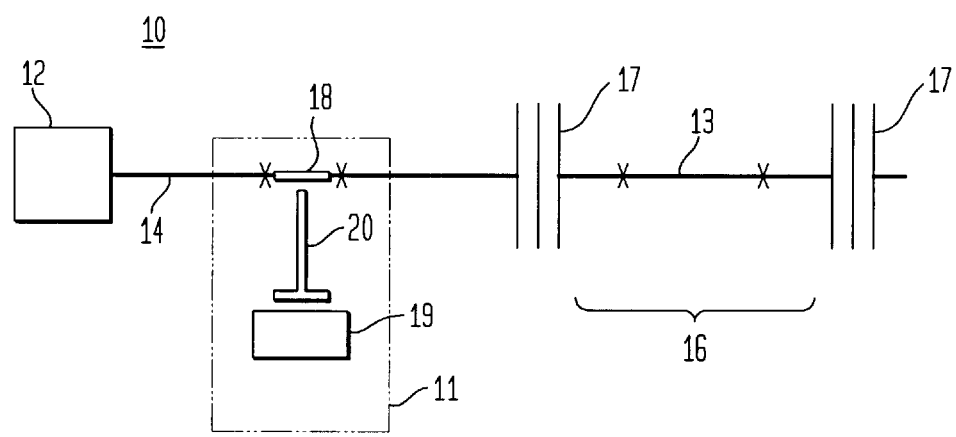
FIG. 1 is a schematic illustration of a cladding pumped fiber device including a fluorescence doped indicator waveguide.

Referring to the drawings, FIG. 1 schematically illustrates a pumped waveguide device in the form of a cladding pumped laser 10 including a pump monitor 11. The laser 10 comprises a pump source 12 such as a diode or array of diodes, an active waveguide 13 such as a double clad fiber containing a rare earth doped core as the gain medium, and a pump waveguide 14 for transmitting pump light from the source 12 to the active waveguide 13. The laser 10 includes an optical cavity 16 defined, for example, by reflective gratings 17. Alternatively the gratings 17 can be omitted, and the device when pumped without an input signal forms a monitored broadband ASE light source. With a signal, it forms a monitored optical signal amplifier.

The pump monitor 11 comprises a length of indicator waveguide 18 having a region, such as the core, doped with a material sensitive to the pump light. The sensitive material can be a fluorescent material or a light absorbing material. The indicator waveguide is disposed in the light path between source 12 and active waveguide 13. A detector 19 is coupled to waveguide 18 to detect the effect of pump light on the sensitive material. For example, a photodiode can be coupled to waveguide 18 by a multimode fiber tap 20 to detect fluorescent light. Alternatively, the detector 19 can be an integrating sphere.

In an exemplary implementation, the active waveguide 13 is a star shaped double clad fiber 125 $\mu$m in diameter and doped with $Yb^{+3}$ at a concentration in the range 0.2–1 mol %. It can be pumped by a diode array at 915 nm, and it lases between 1.03 and 1.12 $\mu$m depending on the design of cavity 16. The indicator waveguide 18 can be a short length (1 mm to several cm) of $Yb^{+3}$ doped fiber spliced between the pump fiber 14 and the double clad active fiber 13. Typically the $Yb^{+3}$ concentration will be in the range 1–2%. Optical filters (not shown) can be provided to separate the fluorescence emission above 1 micron from the scattered pump light at 915 nm.

Figure 2:
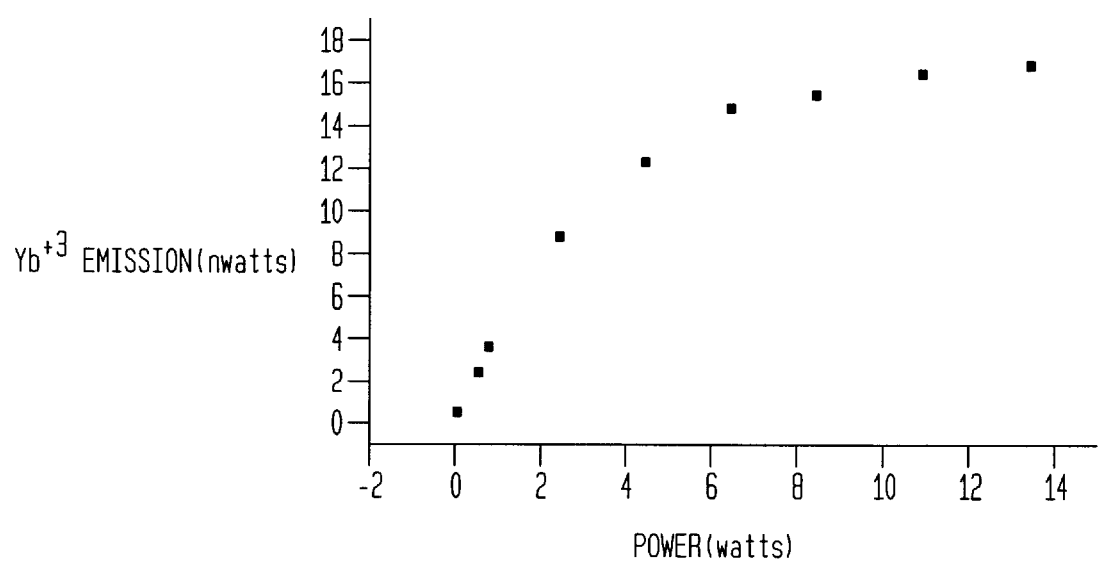
FIG. 2 is a graphical illustration showing the relationship between fluorescence measured and pump power.

FIG. 2 is a graphical illustration showing the signal from the pump monitor 11 as a function of diode output power. The fluorescence signal is proportional to ytterbium concentration. At some pump level, the fluorescence signal saturates. The saturation intensity can be increased by adding dopant ions that quench fluorescence, thereby decreasing the fluorescence lifetime and making more ions available in the ground state. Furthermore, non-linear effects such as cooperative upconversion or energy transfer to a second dopant ion where light is emitted could also be utilized. These have potential advantages in that the emission may be a super-linear function of pump power and, therefore, more sensitive to changes in launched pump light. Moreover, the wavelength of the emitted light may make it easier to filter out the scattered pump light.

In an alternative form of the FIG. 1 device, the indicator waveguide 18 is doped with an absorbing impurity such as a transition element: advantageously V, Cr, Mn, Fe, Co, Ni or Cu. Fe is preferred. Detector 19 is a heat detector thermally coupled to the indicator waveguide 18. The heat generated in the core is proportional to the pump power flowing in the core. A useful heat detector for this application is a thermocouple.

It is to be understood that the above-described embodiments are illustrative of only a few of the many possible specific embodiments which can represent applications of the principles of the invention. The monitor of FIG. 1 can be used for any waveguide laser or amplifier and is not restricted to fiber devices or to cladding pumped devices. Numerous and varied other arrangements can be made by those skilled in the art without departing from the spirit and scope of the invention.

What is claimed:

1. In a pumped optical waveguide device comprising a source of pump light, an active waveguide responsive to the pump light and a pump waveguide for coupling pump light to the active waveguide, the improvement wherein:

an indicator waveguide doped with material sensitive to the pump light is disposed in the optical path between the source and the active waveguide and a detector responsive to the indicator waveguide is coupled to the waveguide to provide a measure of the pump power.

2. The device of claim 1 wherein said indicator waveguide comprises a waveguide having a region doped with fluorescing material and the detector is a photodetector responsive to fluorescent light generated in the indicator waveguide.

3. The device of claim 1 wherein said indicator waveguide comprises a waveguide having a region doped with light absorbing material and the detector is a thermal detector responsive to heat generated in the indicator waveguide.

4. The device of claim 1 wherein said optical waveguide device comprises an optical fiber laser.

5. The device of claim 1 wherein said optical waveguide device comprises a fiber optical amplifier.

6. The device of claim 1 wherein said optical waveguide device comprises a light source.

7. The device of claim 1 wherein said indicator waveguide comprises rare-earth doped fiber.

8. The device of claim 1 wherein said indicator waveguide comprises Yb doped fiber.

9. The device of claim 1 wherein said indicator waveguide comprises a fiber doped with an absorbing impurity.

10. The device of claim 1 wherein said indicator waveguide comprises a fiber doped with a transition element.

11. The device of claim 1 wherein said indicator waveguide combines a fiber doped with an element chosen from the group consisting of, Cr, Mn, Fe, Co, Ni and Cu.

* * * * *